(12) United States Patent
Waelde et al.

(10) Patent No.: US 10,760,940 B2
(45) Date of Patent: Sep. 1, 2020

(54) FILL LEVEL DEVICE

(71) Applicant: VEGA Grieshaber KG, Wolfach (DE)

(72) Inventors: Steffen Waelde, Niedereschach (DE); Christian Weinzierle, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 386 days.

(21) Appl. No.: 15/730,976

(22) Filed: Oct. 12, 2017

(65) Prior Publication Data
US 2018/0102584 A1    Apr. 12, 2018

(30) Foreign Application Priority Data
Oct. 12, 2016  (EP) .................................... 16193550

(51) Int. Cl.
*G01F 23/284*    (2006.01)
*H01Q 13/02*     (2006.01)
(Continued)

(52) U.S. Cl.
CPC .............. *G01F 23/284* (2013.01); *G01S 7/03* (2013.01); *H01P 3/081* (2013.01); *H01P 5/028* (2013.01);
(Continued)

(58) Field of Classification Search
CPC .......... G01F 23/284; G01S 7/03; H01P 3/081; H01P 5/028; H01P 5/107; H01Q 1/225;
(Continued)

(56) References Cited

U.S. PATENT DOCUMENTS 3,573,835 A    4/1971   Stark et al.
6,456,241 B1 *  9/2002   Rothe ................ H01Q 21/0081
                                              343/700 MS
(Continued)

FOREIGN PATENT DOCUMENTS

CN    201210521 Y    3/2009
CN    101416346 A    4/2009
(Continued)

OTHER PUBLICATIONS

European Search Report dated Apr. 28, 2017 for European Patent Application No. 16193550.7.
(Continued)

*Primary Examiner* — Timothy A Brainard
*Assistant Examiner* — Nuzhat Pervin
(74) *Attorney, Agent, or Firm* — Hunton Andrews Kurth LLP (57) ABSTRACT

A fill level device according to an exemplary embodiment of the present disclosure can be provided. For example, the fill level device can include waveguide couplings, each of which can include a radiator element connected to a microstrip line configured to transmit and/or receive a radar signal, a waveguide configured to conduct the radar signal and a substrate on which the microstrip line, the radiator element and the waveguide can be arranged. The waveguide can have a cross section with a narrow side and a wide side. The narrow side can be shorter than the wide side. The microstrip line can be guided through the narrow side of the waveguide into the waveguide to the radiator element that is arranged in the interior of the waveguide. The microstrip line and the radiator element can be arranged on a surface of the substrate facing the waveguide.

16 Claims, 12 Drawing Sheets

(51) Int. Cl.
*H01Q 21/06* (2006.01)
*H01Q 15/08* (2006.01)
*G01S 7/03* (2006.01)
*H01P 3/08* (2006.01)
*H01P 5/02* (2006.01)
*H01Q 1/22* (2006.01)
*H01Q 19/08* (2006.01)
*H01Q 3/44* (2006.01)
*H01P 5/107* (2006.01)
*H01Q 13/06* (2006.01)
*H01Q 21/08* (2006.01)

(52) U.S. Cl.
CPC ............. *H01Q 1/225* (2013.01); *H01Q 13/02* (2013.01); *H01Q 15/08* (2013.01); *H01Q 19/08* (2013.01); *H01Q 21/064* (2013.01); *H01P 5/107* (2013.01); *H01Q 3/446* (2013.01); *H01Q 13/06* (2013.01); *H01Q 21/08* (2013.01)

(58) Field of Classification Search
CPC ........ H01Q 13/02; H01Q 15/08; H01Q 19/08; H01Q 21/064; H01Q 3/446; H01Q 13/06; H01Q 21/08
USPC ........................................................ 342/124
See application file for complete search history.

(56) References Cited

U.S. PATENT DOCUMENTS

| | | | | |
|---|---|---|---|---|
| 7,639,197 | B1* | 12/2009 | Herting | H01P 1/181 333/157 |
| 7,688,269 | B1* | 3/2010 | West | H01P 1/182 333/125 |
| 2005/0062650 | A1* | 3/2005 | Furuno | H01Q 1/243 343/700 MS |
| 2005/0104780 | A1* | 5/2005 | Gottwald | H01Q 13/02 343/700 MS |
| 2006/0066497 | A1* | 3/2006 | Fischer | H01Q 21/08 343/770 |
| 2008/0252553 | A1* | 10/2008 | Leadley-Brown | H01Q 1/12 343/878 |
| 2009/0295663 | A1* | 12/2009 | Sato | H01Q 21/24 343/788 |
| 2010/0156573 | A1* | 6/2010 | Smith | H01Q 15/04 333/239 |
| 2014/0007674 | A1* | 1/2014 | Weinzierle | G01F 23/284 73/290 V |
| 2014/0009323 | A1* | 1/2014 | Weinzierle | H01Q 13/02 342/124 |
| 2014/0125425 | A1* | 5/2014 | Shen | H01P 5/12 333/26 |
| 2020/0005988 | A1* | 1/2020 | Iyer | A61N 1/3787 |

FOREIGN PATENT DOCUMENTS

| | | | | |
|---|---|---|---|---|
| DE | 102006015338 A1 | * | 10/2007 | .......... H01Q 9/0435 |
| DE | 102010034525 A1 | * | 2/2011 | ................ H01P 3/08 |
| DE | 102010034525 A1 | | 2/2011 | |
| EP | 2765361 A1 | * | 8/2014 | .......... F25D 19/067 |
| EP | 2765361 B1 | * | 6/2015 | .......... F24D 19/067 |
| JP | 05160611 A | * | 6/1993 | ............. H01P 5/107 |
| JP | H05160611 A | | 6/1993 | |
| JP | H11195922 A | | 7/1999 | |
| KR | 20090133087 A | | 12/2009 | |
| WO | WO-2004030141 A1 | * | 4/2004 | ............. H01Q 9/045 |
| WO | WO-2006077184 A1 | * | 7/2006 | .......... H01Q 25/007 |
| WO | WO-2007115708 A2 | * | 10/2007 | .......... G01F 23/284 |
| WO | WO-2014006150 A1 | * | 1/2014 | ............. H01Q 13/02 |
| WO | 2016155822 A1 | | 10/2016 | |
| WO | WO-2016155822 A1 | * | 10/2016 | ............... G01S 7/03 |

OTHER PUBLICATIONS

Chen, X. et al., "Ultra-Wideband CPW-Fed Antenna with Round Corner Rectangular Slot and Partial Circular Patch," vol. 1 No. 4, pp. 847-851, Aug. 6, 2007.
Yoo, Sungjun et al., "Design of Microstrip Patch Antennas with Parasitic Elements for Minimized Polarization Mismatch," 2016 URSI Asia-Pacific Radio Science Conference, IEEE, pp. 1845-1846, Aug. 21, 2016.
Seo, Kazuyuki., "Planar Microstrip-To-Waveguide Transition in Millimeter-Wave Band," INTECH, Chapter 11, pp. 1-30, 2013 http://dx.doi.org/10.5772/54662.
Seo, Kazuyukl, "Nagoya institute of Technology Repository" Thesis or Dissertation, Mar. 31, 2011, pp. 1-154, http:repo.lib.nitech.ac.jp/handle/123456789/2285.
Topak, Eray et al., Compact Topside Millimeter-Wave Waveguide-to-Microstrip Transitions, IEEE Microwave and Wireless Components Letters, vol. 23, No. 12, pp. 641-643, Dec. 2013.
European Communication Pursuant to Article 94(3) dated Apr. 29, 2020 issued in European Application No. 16193550.7.
Chinese Office Action and Search Report dated Mar. 17, 2020 issued in Chinese application No. 201710946258.4.

* cited by examiner

FILL LEVEL DEVICE

CROSS-REFERENCE TO RELATED APPLICATION(S)

This application claims the benefit and priority European Patent Application No. 16 193 550.7 filed on Oct. 10, 2016, the entire disclosure of which is incorporated herein by reference.

FIELD OF THE PRESENT DISCLOSURE

The present disclosure relates to level measurement, in general. In particular, the present disclosure relates to an exemplary waveguide coupling for a radar antenna, which, for example, may be configured as a fill level radar antenna and/or as a line scanner. The present disclosure further relates to an exemplary fill level radar antenna having a corresponding waveguide coupling and to a fill level measurement device having a fill level radar antenna.

BACKGROUND INFORMATION

Fill level measurement devices having fill level radar antennas may be used for detecting the surface topology of a filling material surface of, for example, bulk materials or moving liquids. In such case, the surface of the filling material is frequently scanned using a measuring beam and the surface topology is thus determined. A one-dimensional array, known as a line scanner, composed of a large number of radiator elements, for example, may be used to control the measuring beam, so that the array facilitates a one-dimensional scanning of the filling material surface. If this array is further rotated, a two-dimensional scanning of the surface can take place.

SUMMARY OF EXEMPLARY EMBODIMENTS

One of the objects of the present disclosure is to provide a waveguide coupling for a radar antenna, e.g., a fill level radar antenna, with which an improved focusing of an emitted radar signal can be achieved and which can (e.g., at the same time) have a compact design.

This exemplary object is achieved with the exemplary embodiments of the present disclosure which are described herein.

For example, a waveguide coupling for a radar antenna, e.g., which can be or include a fill level radar antenna according to an exemplary embodiment of the present disclosure. The exemplary waveguide coupling can comprise a radiator element connected to a microstrip line and configured to transmit and/or receive a radar signal. The exemplary waveguide coupling can also comprise a waveguide to conduct the radar signal and a substrate, such as, e.g., a circuit board, on which the microstrip line, the radiator element and the waveguide are arranged. In this exemplary embodiment, the waveguide, in a cross section through the waveguide, can have a narrow side and a wide side, where the narrow side can be shorter than the wide side. The narrow side and the wide side can be measured here on an inner face, side or surface of the waveguide or on an outer face, side or surface of the waveguide. The microstrip line can be guided through the narrow side of the waveguide into the waveguide to the radiator element that can be arranged in the interior of the waveguide. The microstrip line and the radiator element can be arranged on a face, side and/or surface of the substrate facing the waveguide. The face may refer to, for example, an outer face, a side and/or an outside of the substrate.

As one example, the radiator element can be called, e.g., a "patch," and may denote a planar, flat and/or plate-shaped conductor element, e.g., made of copper, on which the microstrip line is arranged. The radar signal, or, in general, an electromagnetic signal, can be fed using the microstrip line into the radiator element, which thereupon can emit the radar signal (or the electromagnetic signal) with a specific orientation of the field vector of the electrical field of the radar signal/electromagnetic signal. The emitted radar signal can then couple and/or overcouple into the waveguide and can then, e.g., be guided and emitted to an antenna element of the radar antennas and/or fill level radar antenna. Further, a radar signal, (e.g., a radar signal reflected from a filling material surface) can also be coupled by an antenna element into the waveguide, and/or overcoupled from there onto the radiator element. This signal can then in turn be fed by the microstrip line to an evaluation electronics system.

For example, for a one-dimensional array antenna such as a line scanner, a plurality of waveguide couplings as described herein can be aligned on an axis, i.e., arranged along substantially a straight line. In order to now achieve an improved focusing using a radar antenna and/or fill level radar antenna, for example, a diameter of the main beam or the main lobe emitted using the radar antenna and/or fill level radar antenna can be reduced. In addition, it may be advantageous to avoid side lobes and/or grating lobes caused by interference.

In view of the exemplary configuration according to an exemplary embodiment of the present disclosure of the waveguide coupling, in which the microstrip line is introduced into the waveguide at the narrow side of the waveguide, the waveguide coupling can provided as a compact design, and/or a plurality of waveguide couplings of this type can be arranged close together in a radar antenna and/or fill level radar antenna. As a result, a spacing of adjacent waveguide couplings and/or adjacent waveguides can be provided which is smaller than or equal to half the wavelength of the emitted radar signal. Thus, in such exemplary manner, a diameter of the main lobe can be reduced, side and/or grating lobes can be avoided, and an improved focusing can be achieved. In addition, an amplification of the radar signal can be achieved.

According to an exemplary embodiment of the present disclosure, the interior of the waveguide can be filled at least in part with a dielectric and/or dielectric material. As a result, the cross-sectional face and/or cross-sectional area of the waveguide can be reduced and the size of the waveguide coupling can be further reduced.

According to another exemplary embodiment of the present disclosure, the cross-sectional face and/or a cross-sectional area of the waveguide can be elliptical, oval or rectangular. For example, the cross-sectional face may be a rectangle with rounded corners. The cross-sectional face may refer to the face of an internal cross section of the waveguide so the waveguide may also, e.g., have a round outer cross section and an elliptical, oval or rectangular internal cross section.

According to yet another exemplary embodiment of the present disclosure, the radiator element can be plate-shaped, e.g., being configured to be flat, planar and/or as a patch. Alternatively or in addition, the radiator element can have a first corner and a second corner, the first corner having a smaller radius of curvature than the second corner. For example, the first and second corners differ with respect to their radii of curvature. The first and second corners can, in each case, denote outer edges of the radiator element here. The first corner may, for example, have a radius of curvature of between approximately or exactly 0.2 mm and 0.3 mm, and for example, approximately or exactly 0.25 mm. Alternatively or in addition, the second corner may have a radius of curvature of between approximately or exactly 0.5 mm and 0.6 mm, and for example, approximately or exactly 0.55 mm. The first corner can, alternatively or in addition, oppose the second corner, e.g., the first and second corners may oppose one another with respect to a longitudinal direction of the radiator element. Furthermore, alternatively or in addition, the radiator element can have at least two corners with identical radii of curvature. Thus, for example, a further corner can be provided, which has a radius of curvature that is identical to the first or second corner.

Due to the exemplary geometric configuration of the exemplary radiator element, a direction of the electrical field vector of the radar signal emitted by the radiator element can be influenced. Furthermore, the basic mode can be excited in the waveguide since signals of higher modes have different propagation speeds, which can lead to measuring errors in some circumstances. In a conventional waveguide coupling, the microstrip line and the radiator element are generally introduced from the wide side of the waveguide such that the electrical field vectors of the waveguide basic mode and the radar signal emitted by the radiator element are oriented parallel to one another. According to an exemplary embodiment of the present disclosure, the microstrip line can be introduced through the narrow side, so the electrical field vectors are no longer oriented parallel to one another. In view of the exemplary geometric configuration of the exemplary radiator element described herein, the electrical field vector of the radar signal emitted by the radiator element can be rotated in such a way that this exemplary electrical field vector can be oriented approximately, substantially or exactly parallel to the electrical field vector of the waveguide basic mode. A microstrip line/waveguide transition according to the exemplary embodiment of the present disclosure can thereby be provided overall.

According to a further exemplary embodiment of the present disclosure, for a bandwidth increase and/or to increase a bandwidth, approximately, substantially or exactly next to and/or adjacent to the radiator element, a conductor element can be arranged or provided in the interior of the waveguide. The exemplary conductor element can be referred to as, e.g., a parasitic conductor element or parasitic patch element. A longitudinal direction of the conductor element can thus run and/or extend transversely to a longitudinal direction of the microstrip line. Alternatively or in addition, at least two corners of the conductor element can have different radii of curvature. For example, the bandwidth of the microstrip line/waveguide transition can be increased using the conductor element.

According to a still further exemplary embodiment of the present disclosure, the waveguide can have, on the narrow side, a recess with which the microstrip line can be guided to the radiator element arranged in the interior of the waveguide. The recess of the waveguide c, for example, be configured on an end face and/or surface of the waveguide.

In another exemplary embodiment of the present disclosure, a fill level radar antenna can be provided which can have a plurality of waveguide couplings, as described herein. Adjacent radiator elements, e.g., directly and/or immediately adjacent radiator elements, of the waveguide couplings can be spaced apart from one another at a spacing, which can be equal or smaller than half the wavelength of the radar signal. As a result, focusing of the fill level radar antenna can be improved. The highest frequency of the radar signal can be, for example, about or exactly 81 GHz. Thus, the smallest wavelength occurring in the signal can be about or exactly 3.7 mm, so the maximum spacing between two directly adjacent radiator elements can be about or exactly 1.85 mm.

According to a still further embodiment of the present disclosure, the radiator elements, the microstrip lines and the waveguides of the plurality of waveguide couplings can be arranged on a common substrate, e.g., including or being a circuit board substrate. The fill level radar antenna can be, for example, configured as a parabolic trough, as a horn radiator array antenna and/or as an array antenna, for example, as a one-dimensional antenna or a two-dimensional array antenna.

In another exemplary embodiment of the present disclosure, the fill level measurement device can include a fill level radar antenna, as described herein. The fill level measurement device can be configured, for example, to determine the topology of a filling material surface.

Exemplary features and elements of the waveguide coupling, as described herein, can be or include exemplary features and elements of the fill level radar antenna and/or of the fill level measurement device, as described herein. Conversely or additionally, exemplary features and elements of the fill level radar antenna and/or of the fill level measurement device, as described herein, can be or include features and elements of the waveguide coupling, as described herein.

Each and every exemplary embodiment and aspect described herein, and their components, portions, configurations, procedures and procedures can be performed, combined and interchanged with one or more of other exemplary embodiments and aspects described herein.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 3b is a front view of an exemplary array of the waveguide couplings, one of which is shown in FIG. 3a;

FIG. 3c is a front view of another exemplary array of the waveguide couplings, one of which is shown in FIG. 3a.

FIG. 5b is a perspective view of the waveguide coupling shown in FIG. 5a;

FIG. 6b is a perspective view of the waveguide coupling shown in FIG. 6a;

FIG. 7b is a perspective view of the array of waveguide couplings shown in FIG. 7a.

Throughout the drawings, the same reference numerals and characters, unless otherwise stated, are used to denote like features, elements, components, or portions of the illustrated embodiments. The views in the drawings are merely schematic and are not to scale. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

Figure 1:
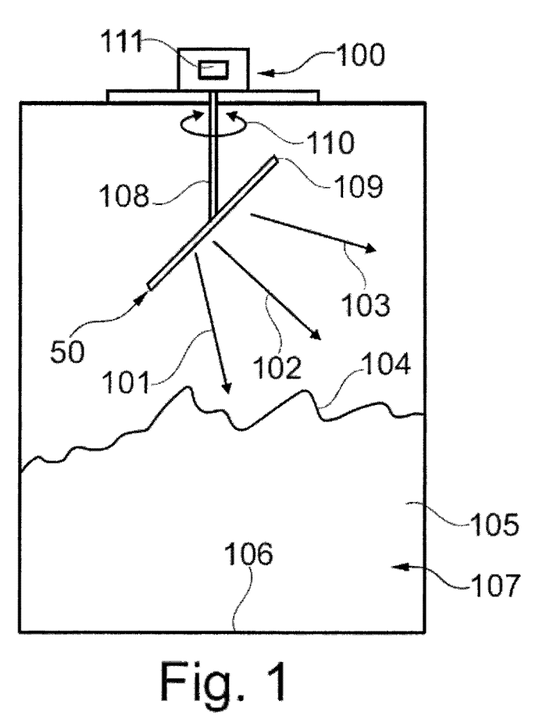
FIG. 1 is side view of a fill level measurement device according to an exemplary embodiment of the present disclosure.

FIG. 1 shows a topology-detecting fill level measurement device 100 according to an exemplary embodiment of the present disclosure, which can have a fill level radar antenna 50 as described herein. The exemplary fill level measurement device 100 is configured to detect echo signals and/or echo curves from different angle ranges 101, 102, 103. For each echo curve determined, the distance from the respective point on the surface 104 of the filling material and/or the bulk material 105 is detected. The volume of the bulk material pile 107 can thus also be determined using an exemplary numeric integration of these distance values and by postulating a level surface 106 under the bulk material or with a known container geometry. The mass of the bulk material 105 can furthermore be calculated or otherwise determined when the density is known.

The exemplary fill level measurement device 100 can have an antenna holder 108 for fastening the fill level radar antenna 50. Depending on the exemplary configuration of the fill level measurement device 100, the antenna holder 108 can facilitate a mechanical adjustment of the main beam direction of the fill level radar antenna 50, for example by rotating 110 or by tilting. Furthermore, the fill level measurement device 100 can be configured to carry out a digital beam shaping. The exemplary fill level measurement device 100 can include a fill level radar antenna consisting of, e.g., a plurality of transmitting and/or receiving elements and an evaluation unit (e.g., one or more computer processors, one or more computer arrangements, etc.) 111 for implementing an exemplary method of digital beam shaping.

Figure 2:
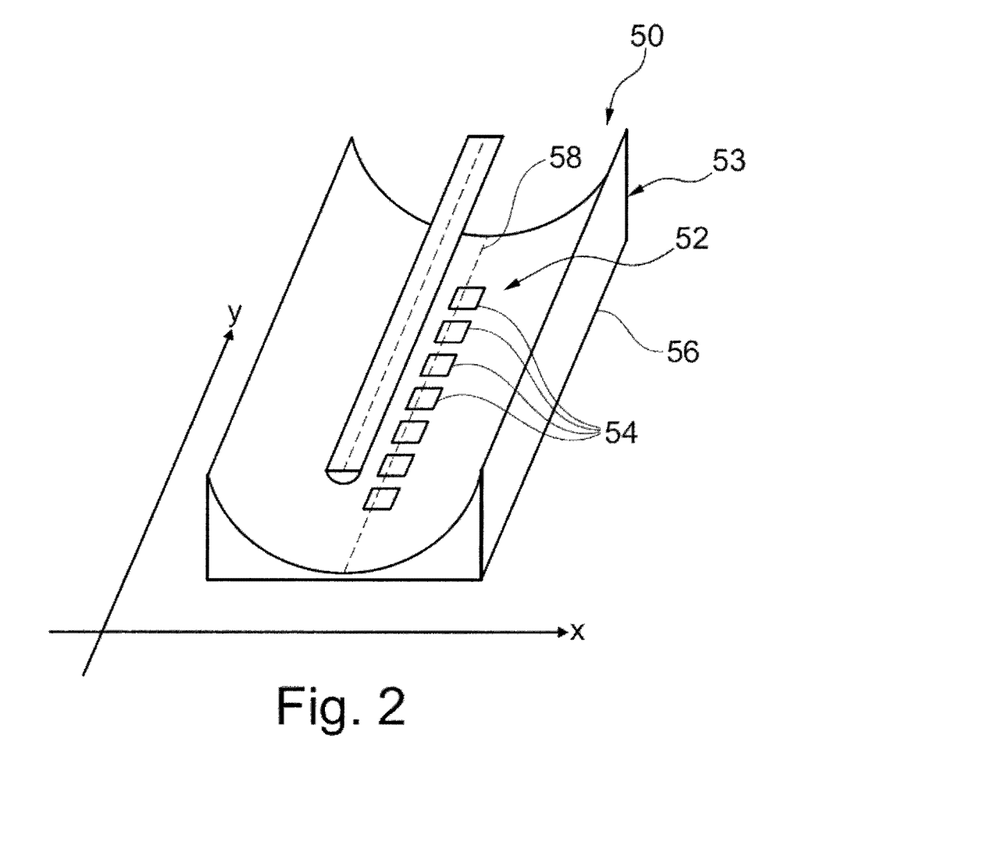
FIG. 2 is perspective view of a fill level radar antenna according to an exemplary embodiment of the present disclosure.

FIG. 2 shows an exemplary radar antenna 50 and/or an exemplary fill level radar antenna 50 for topology-detecting level measurement. The fill level radar antenna 50 can comprise an array antenna 53 with an antenna arrangement 52. The antenna arrangement 52 can have a plurality of antenna elements 54 arranged in a row 58, with which each of which a radar signal can be emitted and/or received.

The exemplary array antenna 53 can, for example, be fastened on a rotatable holder 108 (illustrated in FIG. 1). The array antenna 53 focuses the electromagnetic waves or radar signals emitted and/or received by the antenna elements 54 along the x-direction (transverse direction). The focusing of the corresponding signals along the y-direction (longitudinal direction), on the other hand, only takes place after the detection of the received signals within the evaluation unit 111 (illustrated in FIG. 1) by digital beam shaping. For example, such exemplary configuration can also facilitate a targeted control of the main receiving direction of the antenna arrangement in the y-direction. The array antenna 53 can, for example, be configured as a parabolic trough 56 or as a horn radiator array antenna.

If the array antenna 53 is connected to a static holder instead of to a rotatable holder 108, a two-dimensional antenna array, which can have a large number of antenna elements 54 distributed along the x- and y-direction, can be provided in this exemplary manner. The evaluation unit 111 (shown in FIG. 1) can link the signals received by the antenna elements 54 using the exemplary method of two-dimensional digital beam shaping, and can facilitate a deflection of the main receiving direction both along the x- and along the y-axis in a targeted manner.

To avoid grating lobes during the digital beam shaping, the physical distance between two adjacent antenna elements 54 can be smaller than or equal to half the wavelength of the radar signals used. This exemplary configuration can regularly lead to a high number of antenna elements 54, and therefore to a high outlay for circuitry and associated high production costs for the fill level radar antenna 50.

Figure 3A:
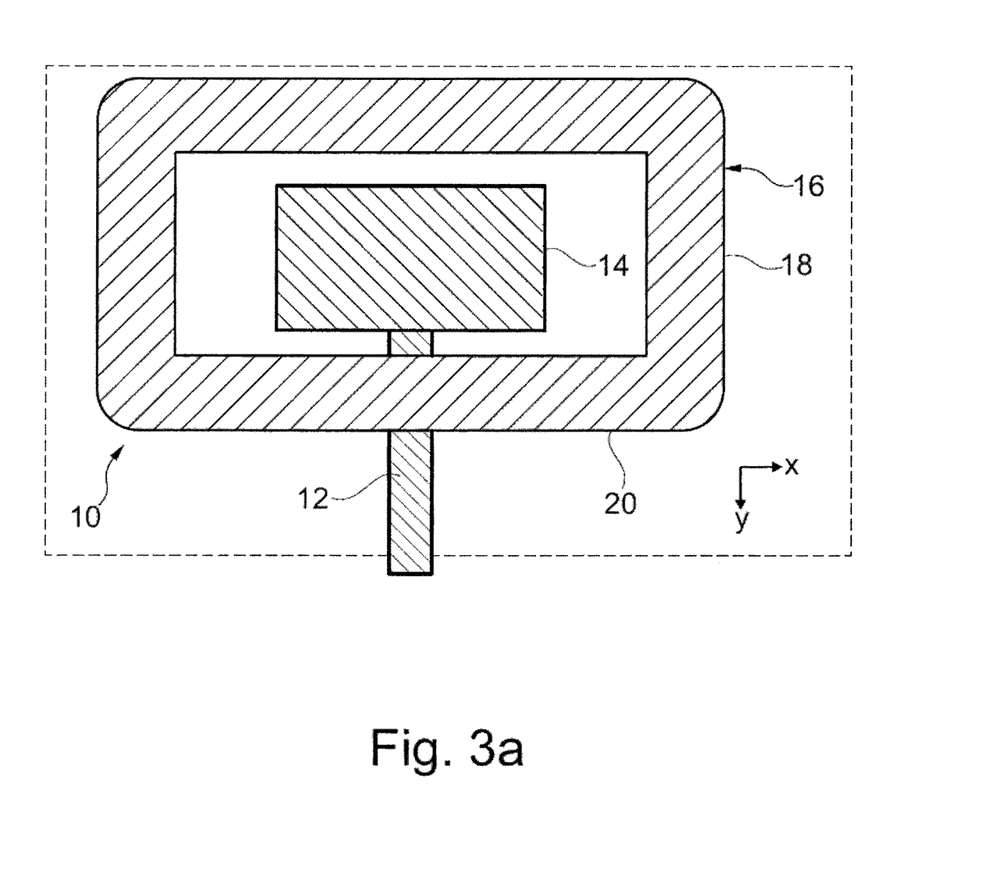
FIG. 3a is a front view of a waveguide coupling for a radar antenna according to an exemplary embodiment.
Figure 3B:
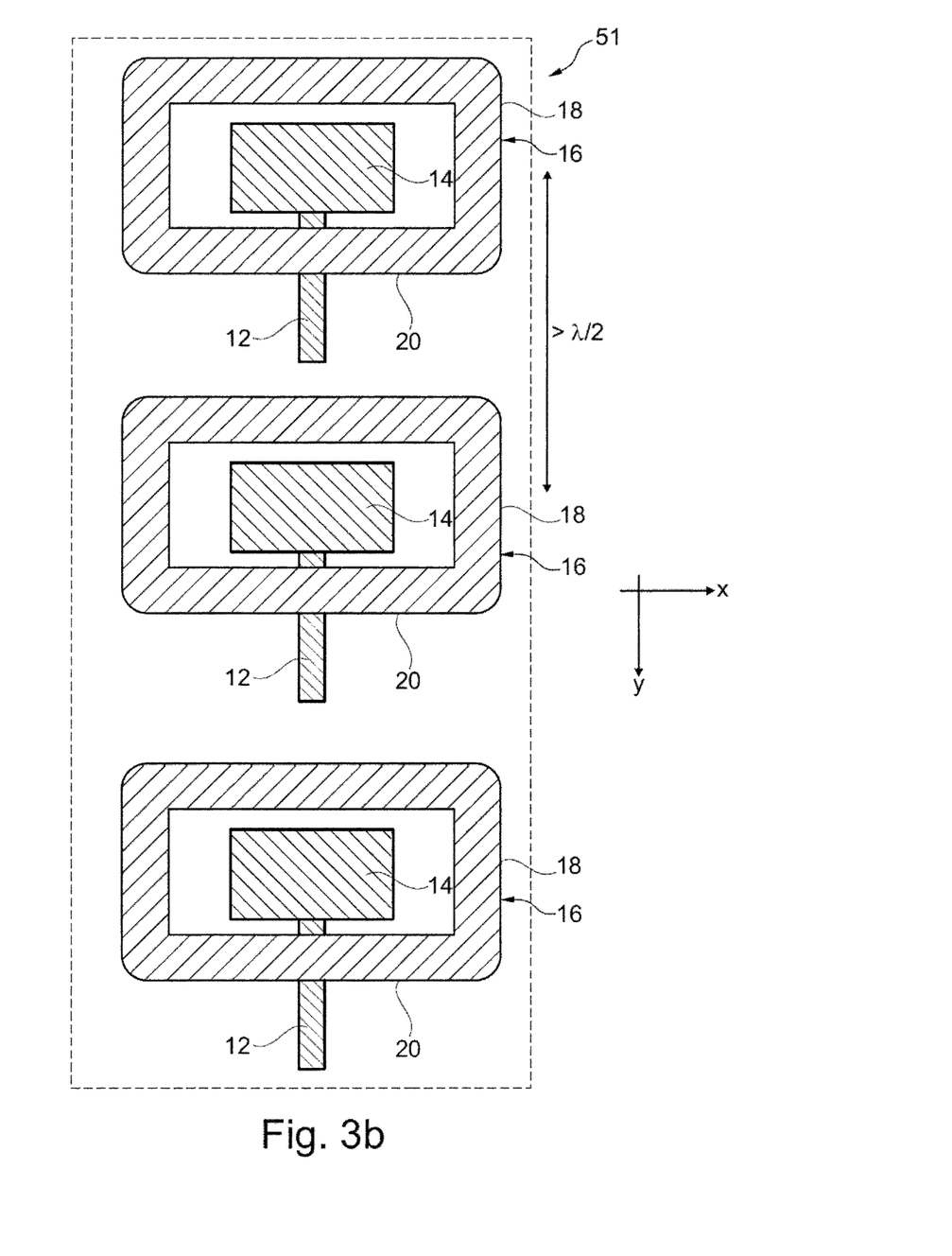
Figure 3C:
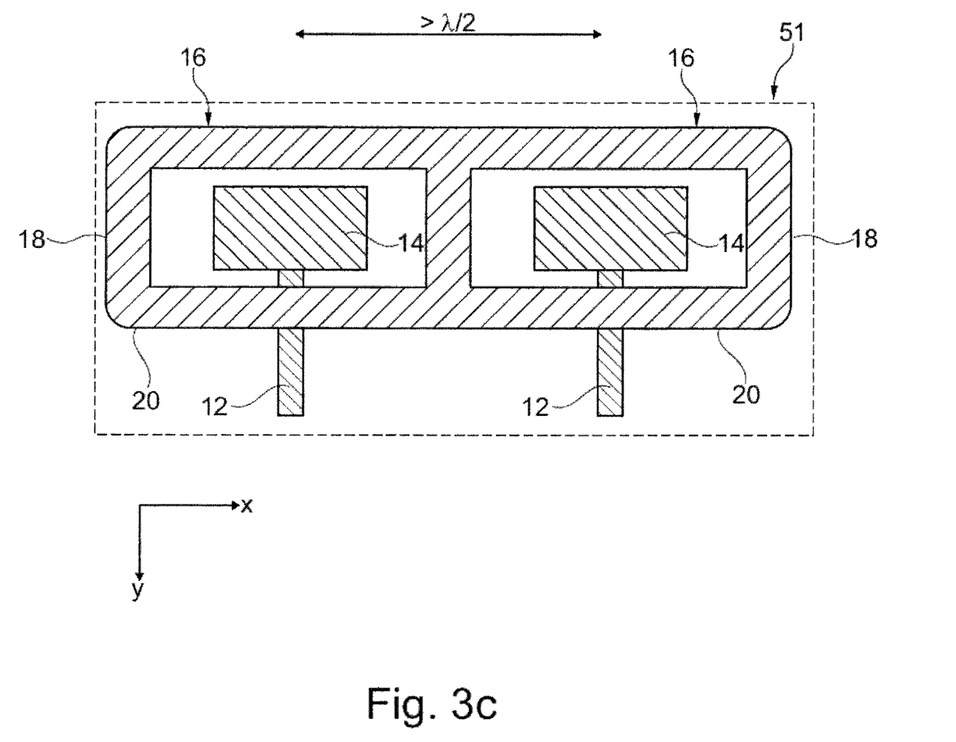

FIG. 3a shows a front view of a waveguide coupling 10 for a fill level radar antenna 50 according to an exemplary embodiment of the present disclosure. FIG. 3b and FIG. 3c each shows an exemplary array 51 of waveguide couplings 10 illustrated in FIG. 3a for the exemplary fill level radar antenna 50. The waveguide couplings 10 can be arranged in the y-direction, as shown in FIG. 3b. As one example, the "array 51 of waveguide couplings 10" may denote or referred to as an "arrangement 51 of waveguide couplings 10".

The waveguide coupling 10 can have a microstrip line 12, at the end of which a radiator element 14 can be arranged and/or fastened. The radiator element 14 can also be referred to as an emitting element 14 or a patch element 14. Furthermore, the waveguide coupling 10 can include a waveguide 16, which can have a rectangular cross section, optionally with rounded edges or straight edges. Waveguide couplings 10 of this type can also be called rectangular waveguide coupling transitions 10. The waveguide 16, in cross section, can have a narrow side 18 and a wide side 20, which is longer than the narrow side 18. Furthermore, shown in FIGS. 3a-3c, the microstrip line 12 can be guided through to or on the wide side 20 of the waveguide 16, and can be connected there to the radiator element 14 arranged in the interior of the waveguide 16. In this exemplary configuration, an electromagnetic wave or a radar signal, which is fed into the radiator element 14 through the microstrip line 12, e.g., from a high frequency front end of the fill level radar antenna 50, can overcouple into the waveguide. This exemplary can be advantageous in that the field vector of the electrical field of the emitted radar signal is oriented in the same direction as the electrical field vector of the basic mode of the waveguide 16. The electrical field vectors are both oriented in the y-direction in this case.

For a one-dimensional array antenna 53 and/or a line scanner, a plurality of waveguide couplings 10 of this type can be aligned on an axis 58 (as shown in FIG. 2), and can have a spacing of less than or equal to half the wavelength of the radar signal, i.e. ≤$\lambda/2$, $\lambda$ referring to the smallest wavelength of the radar signal used (see FIGS. 3b and 3c).

Because of the exemplary microstrip line 12, which is guided out of the waveguides 16, a spacing ≤λ/2 likely cannot be achieved in the exemplary embodiment of the array 51 of waveguide couplings 10 shown in FIG. 3b, which can be installed in the fill level radar antenna 50. In the exemplary configuration shown in FIG. 3c, the spacing ≤λ/2 likely cannot be achieved, as the dimensions of the wide sides 20 of the waveguides 16 are already greater than 212.

Figure 4:
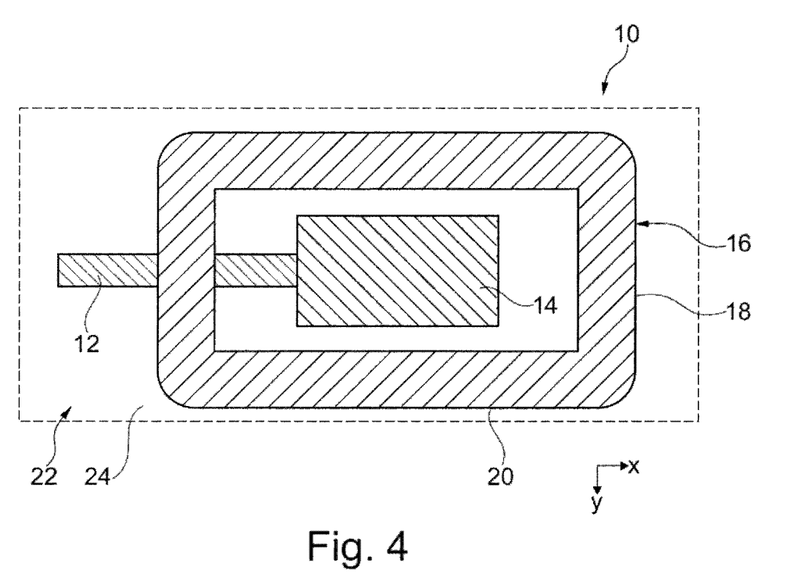
FIG. 4 a front view of the waveguide coupling for a fill level radar antenna according to another exemplary embodiment of the present disclosure.

FIG. 4 shows the waveguide coupling 10 for a fill level radar antenna 50 according to another exemplary embodiment of the present disclosure. If not otherwise described, the waveguide coupling of FIG. 4 has the same elements, components and features as in the drawings described herein above.

Figure 5B:
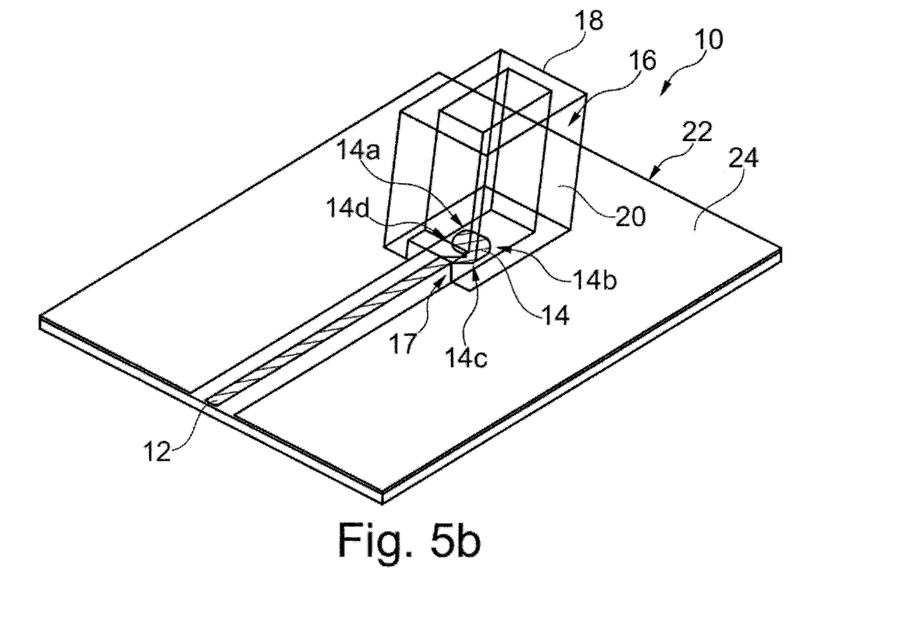

For example, as illustrated in FIG. 4, the microstrip line 12, the radiator element 14 and the waveguide 16 can be arranged on a substrate 22, for example, being or including a circuit board 22, and the microstrip line 12 and the radiator element 14 can be arranged and/or fastened on a face 24 of the substrate 22 facing the waveguide 16. The face 24 can, for example, refer to an outer face 24, a side 24 and/or an outside 24 of the substrate 22. The face 24 can, for example, also refer to a top layer and/or a surface layer of the substrate 22. The substrate 22 itself is only shown schematically in the drawings, and is not limited thereby. The substrate 22 can have further layers and/or a thickness that is greater than a thickness of the microstrip line 12, as shown in FIGS. 5b, 6b and 7b.

It may be beneficial to provide a compact design of the waveguide coupling 10 and the fill level radar antenna 50 equipped therewith, in which adjacent waveguide couplings 10 and/or adjacent waveguides 16 have a spacing from one another that is smaller than half the wavelength of the radar signal (≤λ/2). To that end, according to an exemplary embodiment of the present disclosure, it can be beneficial to guide the microstrip line 12 to the narrow side 18 of the waveguide 16 into the waveguide 16. A microstrip line/waveguide transition of this exemplary configuration can be, e.g., advantageous for a line scanner, due to a spacing of the waveguides 16 and therefore of the antennas and/or the waveguide couplings 10 of ≤λ/2, the occurrence of grating lobes can be avoided. Despite the small spacing of ≤λ/2, the radiator elements 14 can also in each case still be fed in this manner with a microstrip line 12.

The technical challenge when coupling the microstrip line 12 on the narrow side 18 of the waveguide 16 can be the rotation of the electrical field of the emitting element in such a way that the basic mode is excited in the waveguide 16. As shown in FIG. 4, the electrical field vector of the radar signal emitted by the radiator element 14 is oriented in the x-direction, while the field vector of the waveguide basic mode is oriented in the y-direction. Thus, the emitted electrical field is rotated through 90° in this case with respect to the electrical field of the basic mode of the waveguide 16. It is thus firstly possible with some difficulty, and with high damping to propagate the electromagnetic wave.

Figure 5A:
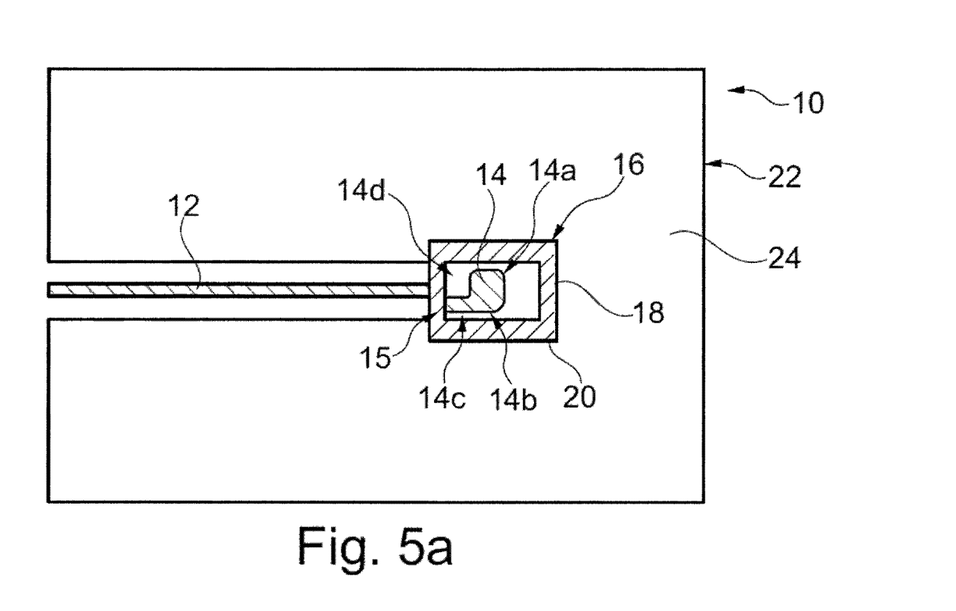
FIG. 5a is a plan view of a waveguide coupling for the fill level radar antenna according to yet another exemplary embodiment of the present disclosure.

FIG. 5a shows a plan view of a waveguide coupling 10 for a fill level radar antenna 50 according to another exemplary embodiment of the present disclosure. FIG. 5b illustrates a perspective view of the waveguide coupling 10 shown in FIG. 5a. If not otherwise described, the exemplary waveguide coupling 10 of FIGS. 5a and 5b has the same elements and features as in the drawings described above.

In order to rotate the electrical field vector of the radar signal emitted by the radiator element 14 and to orient it virtually parallel to the electrical field vector of the basic mode of the waveguide 16, a special geometry of the radiator element 14 can be provided according to an exemplary embodiment of the present disclosure.

The radii of curvature of the corners of the radiator element 14 and the feed point 15, at which the microstrip line 12 is connected to the radiator element, can be substantially used to advantageously rotate the electrical field and thus optimise the coupling into the waveguide 16 or the excitation of the basic mode.

The exemplary radiator element 14 shown in FIGS. 5a and 5b is plate-shaped, and has a first corner 14a, a second corner 14b, a third corner 14c and a fourth corner 14d. The corners 14a to 14d can, for example, denote edges 14a to 14d of the radiator element 14. The first corner 14a can have a smaller radius of curvature than that of the second corner 14b arranged opposing the first corner 14a. The fourth corner 14d has an identical radius of curvature to the second corner 14b. The second corner 14b lies diagonally opposite the fourth corner 14d here and/or in the diagonal direction of the radiator element 14. The first corner 14a can, for example, have a radius of curvature of between approximately or exactly 0.2 mm and 0.3 mm, and for example, approximately or exactly 0.25 mm. The second corner 14b and the fourth corner 14d may each have a radius of curvature of between approximately or exactly 0.5 mm and 0.6 mm, and for example approximately or exactly 0.55 mm.

The microstrip line 12 can be furthermore connected to the radiator element 14 at the third corner 14c, which lies diagonally opposite the first corner and/or in the diagonal direction of the radiator element 14. The feed point 15 can be arranged between the microstrip line 12 and radiator element 14 on and/or in the region of the third corner 14c.

The microstrip line 12 can also be guided on the face 24 of the substrate 22 through a recess 17 in the waveguide 16 configured at the end face on one end of the waveguide 16. The face 24 can, for example, refer to an outer face 24, a side 24 and/or an outside 24 of the substrate 22. The face 24 can, for example, refer to a top layer and/or a surface layer of the substrate 22.

Figure 6A:
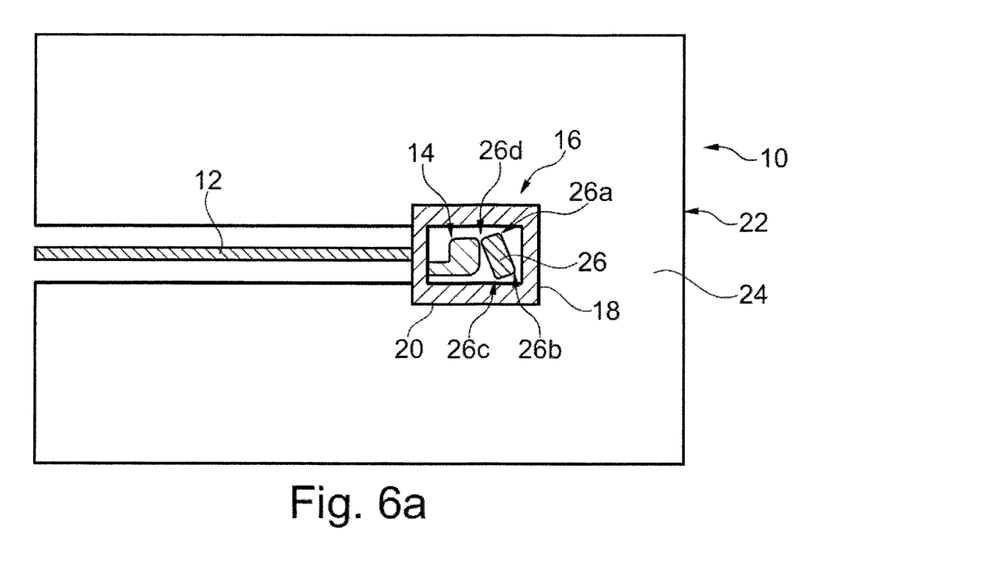
FIG. 6a is a plan view of the waveguide coupling for the fill level radar antenna according to still another exemplary embodiment of the present disclosure.
Figure 6B:
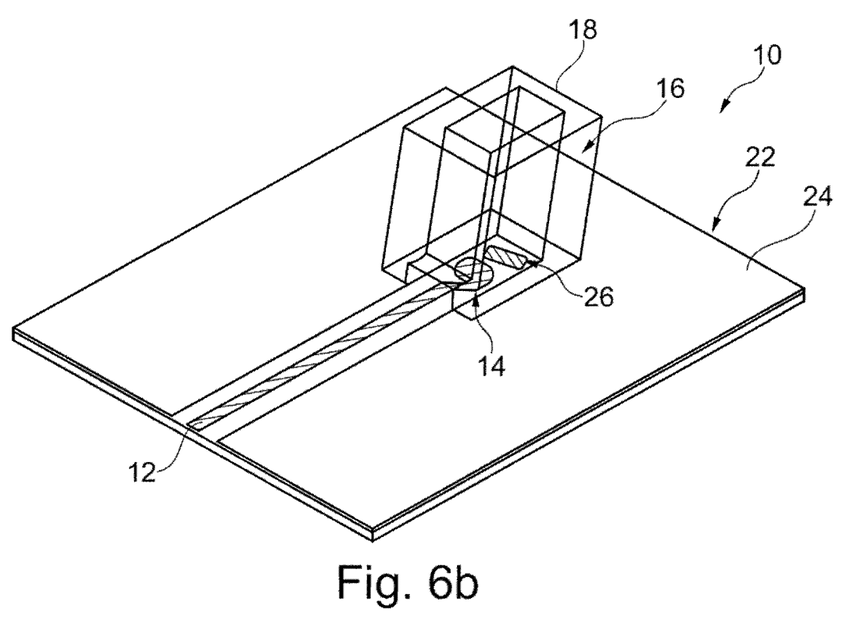

FIG. 6a shows a plan view of a waveguide coupling 10 for a fill level radar antenna 50 according to yet another exemplary embodiment of the present disclosure. FIG. 6b illustrates a perspective view of the waveguide coupling 10 shown in FIG. 6a. If not otherwise described, the waveguide coupling 10 of FIGS. 6a and 6b has the same or similar elements and features as in drawings described above.

Arranged on a side of the radiator element 14 opposing the microstrip line 12, apart from the radiator element 14, is a conductor element 26, which can be called or referred to, e.g., a parasitic element 26 or parasitic patch element 26.

The exemplary conductor element 26 shown in FIGS. 6a and 6b can be plate-shaped and/or substantially rectangular. Furthermore, the exemplary conductor element 26 can be arranged on the substrate 22 and/or the face 24 in the interior of the waveguide 16 in such a way that a longitudinal direction of the conductor element 26 is oriented transversely to the longitudinal direction of the microstrip line 12.

The conductor element 26 of FIGS. 1 6a and 6b can have a first corner 26a, a second corner 26b, a third corner 26c and a fourth corner 26d. The diagonally opposing corners 26a and 26c and the corners 26b and 26d in each case can have identical radii of curvature here. A radius of curvature of the first corner 26a and the third corner 26c can be between approximately or exactly 0.05 mm and 0.15 mm, and for example approximately or exactly 0.1 mm. A radius of curvature of the second corner 26a and the fourth corner 26d can be between approximately or exactly 0.025 mm and 0.075 mm, and for example approximately or exactly 0.05 mm.

Furthermore, the conductor element 26 can be arranged in such a way that the third corner 26c is spaced further apart from the radiator element 14 than the fourth corner 26d.

The conductor element 26, which is placed next to the actual radiator element 14, can be used to increase the bandwidth.

Figure 7A:
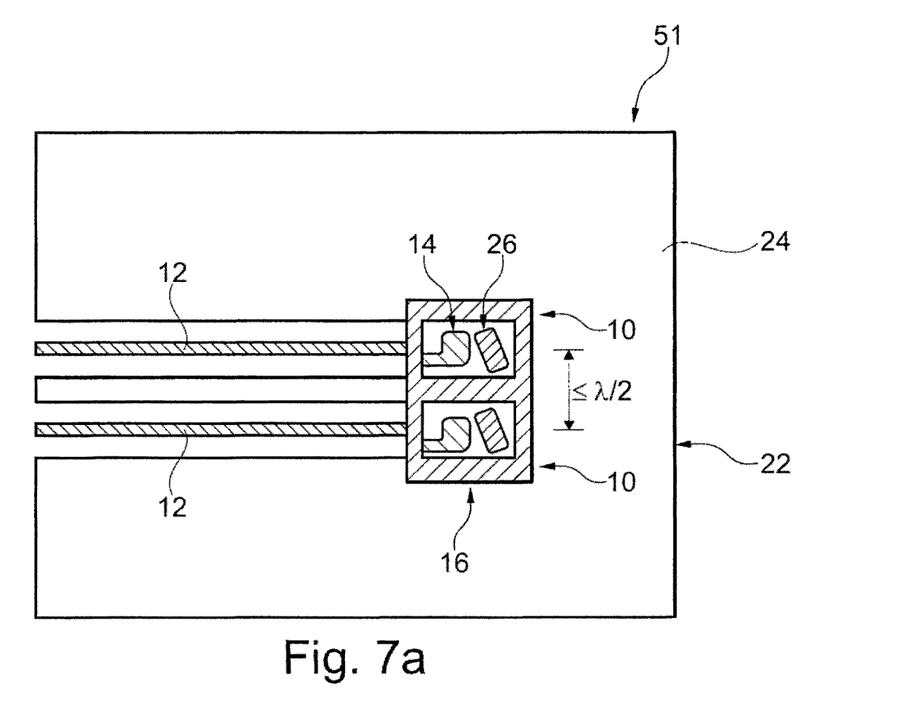
FIG. 7a is a plan view of an array of waveguide couplings with the waveguide couplings shown in FIGS. 6a and 6b according to a further exemplary embodiment of the present disclosure.
Figure 7B:
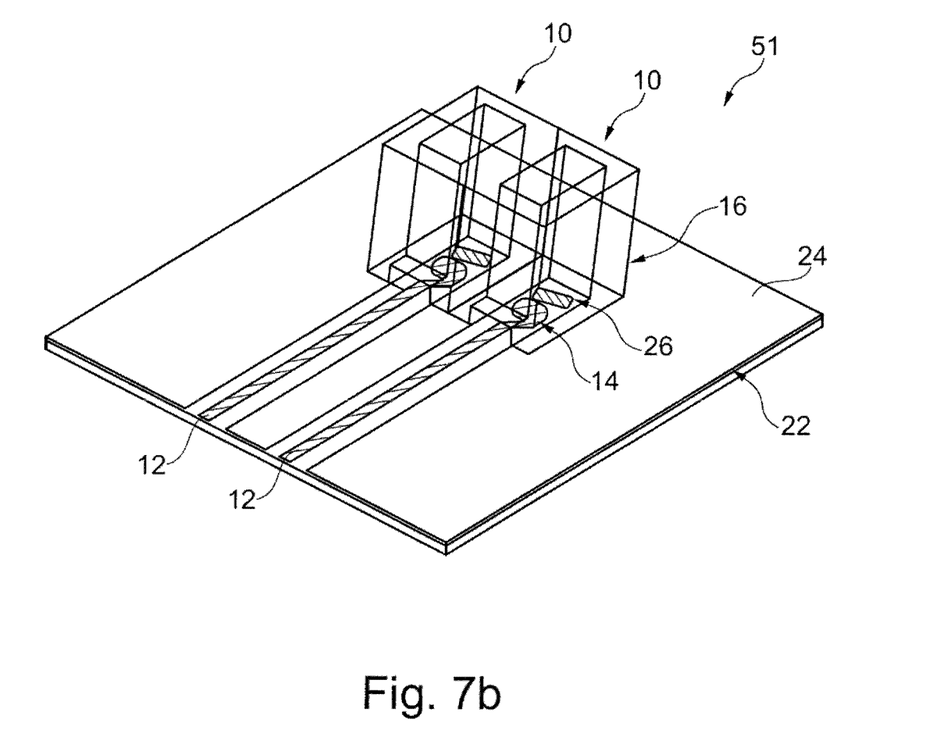

FIG. 7a shows a plan view of an array 51 of waveguide couplings 10 having waveguide couplings 10 from FIGS. 6a and 6b for a fill level radar antenna 50 according to still another exemplary embodiment of the present disclosure. FIG. 7b illustrates a perspective view of the array 51 of waveguide couplings 10 shown in FIG. 7a. If not otherwise described, the waveguide couplings 10 of FIGS. 7a and 7b have similar or the same elements and features as in drawings described above.

For example, the array 51 and/or the arrangement of waveguide couplings 10 of FIGS. 7a and 7b can have two waveguide couplings 10 illustrated in FIGS. 6a and 6b arranged next to one another. As shown in FIGS. 7a and 7b, the waveguide couplings 10 from FIGS. 6a and 6b can be placed next to one another at a spacing ≤λ/2 on a common substrate 22. The microstrip lines 12 and the radiator elements 14 can also be placed next to one another at a spacing ≤λ/2 on the common substrate 22. As this is a reciprocal component, a wave excited in the waveguide 16 couples to the same extent over to the microstrip line 12, as vice versa. Therefore, these exemplary transitions or waveguide couplings 10 be used for transmitting and also for receiving a radar signal.

The microstrip lines 12 can be arranged on the same face 24 of the substrate 22 as the radiator elements 14, the face 24 facing the waveguides 16. The face 24 can, for example, refer to an outer face 24, a side 24 and/or an outside 24 of the substrate 22. The face 24 can also, for example, be or include a circuit board layer, for example, a top layer 24. For example, the radiator element 14 is not fed according to an exemplary embodiment of the present disclosure from the lower side (bottom layer) through the substrate 22 by a microstrip line 12. Exemplary advantages with respect to the layer structure and substrate 22 are produced by the transition proposed here, as summarised below. For example, at high frequencies around about 80 GHz, the substrates 22 of the circuit board can become very thin (<200 μm), and can also be called high frequency substrates (HF substrates). Therefore, the circuit board or substrate 22 can be configured as a sandwich structure for stabilisation in that the thin substrate suitable for high frequencies is glued onto a stable circuit board, for example made of FR4 material, with a prepreg layer. A further circuit board having a similar thickness to the HF substrate 22 can then be applied to the lower side of the FR4 board or circuit board. As a result, a symmetrical layer structure can be achieved having the advantage of not losing its shape on heating.

With such exemplary sandwich structure configuration, etching structures into the HF substrate on the lower side can involve a high outlay in terms of technology, as this lower side can only be glued onto the FR4 core after etching. As a result, warping may develop in the etched HF substrate. The etching can be preferably as carried out once the sandwich structure has been glued together.

In the exemplary structure according to an exemplary embodiment of the present disclosure, a continuous copper face, which is connectable to earth potential and in which no structures have to be etched, can be formed on the lower side of the substrate 22 or on that of the HF board.

It should be pointed out that "comprising" and "having" do not rule out the possibility of other elements or steps and "one" or "a" does not rule out the possibility of a plurality. Furthermore, it should be pointed out that features or steps described with reference to one of the above embodiments may also be used in combination with other features or steps of other above-described embodiments. Reference signs in the claims should not be considered to be restrictive.

Further, it is noted that the foregoing merely illustrates the exemplary principles of the present disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties, as applicable.

What is claimed is:

1. A fill level radar antenna, comprising:
   a plurality of waveguide couplings, wherein each of the waveguide couplings comprises a radiator element configured to at least one of transmit or receive a radar signal, each radiator element being connected to a microstrip line and a waveguide configured to conduct the radar signal; and
   a substrate on which the microstrip lines, the radiator elements and the waveguides are arranged,
   wherein each of the waveguides includes a cross-sectional area that has a narrow side and a wide side, the narrow side being shorter than the wide side,
   wherein each of the microstrip lines is provided through the narrow side of the respective waveguide into the respective waveguide to the respective radiator element which resides in an interior of the respective waveguide,
   wherein each of the microstrip lines and each of the radiator elements are arranged on a surface of the substrate that faces the waveguides, and
   wherein adjacent ones of the radiator elements of the waveguides couplings are arranged at a distance from one another, the distance being smaller or equal to half of a wavelength of the radar signal.

2. The fill level radar antenna according to claim 1, wherein the interior of the waveguide is at least partially filled with a dielectric material.

3. The fill level radar antenna according to claim 1, wherein the cross-sectional area of the waveguide has at least one of an elliptical shape, an oval shape or a rectangular shape.

4. The fill level radar antenna according to claim 1, wherein each of the radiator elements is plate-shaped.

5. The fill level radar antenna according to claim 1, wherein each of the radiator elements has a first corner and a second corner, the first corner having a smaller radius of curvature than the second corner.

6. The fill level radar antenna according to claim 5, wherein the first corner is provided opposite to the second corner in a longitudinal direction of the radiator element.

7. The fill level radar antenna according to claim 5, wherein the first corner has a radius of curvature of between 0.2 mm and 0.3 mm.

8. The fill level radar antenna according to claim 5, wherein the second corner has a radius of curvature of between 0.5 mm and 0.6 mm.

9. The fill level radar antenna according to claim 1, wherein at least two corners of each of the radiator elements have substantially identical radii of curvature.

10. The fill level radar antenna according to claim 1, wherein a conductor element is arranged in the interior of each of the waveguides adjacent to the radiator element so as to increase a bandwidth.

11. The fill level radar antenna according to claim 10, wherein each of the conductor elements extends transversely, along a longitudinal direction, to a longitudinal direction of the microstrip line.

12. The fill level radar antenna according to claim 10, wherein at least two corners of each of the conductor elements have different radii of curvature.

13. The fill level radar antenna according to claim 1, wherein the waveguide has a recess on the narrow side thereof, wherein the recess is used to guide each of the microstrip lines to the respective radiator element arranged in the interior of the respective waveguide.

14. The fill level radar antenna according to claim 1, wherein the radiator elements, the microstrip lines and the waveguides of the at least two of the plurality of waveguide couplings are arranged on a common substrate.

15. The fill level radar antenna according to claim 1, wherein the fill level radar antenna is configured as at least one of a parabolic trough, a horn radiator array antenna, or an array antenna.

16. A fill level measurement device comprising a fill level radar antenna, which comprises:
a plurality of waveguide couplings for a radar antenna, wherein at least two of the waveguide couplings each includes:
a. a radiator element configured to at least one of transmit or receive a radar signal, the radiator element being connected to a microstrip line;
b. a waveguide configured to conduct the radar signal; and
c. a substrate,
wherein the microstrip lines, the radiator elements and the waveguides are arranged on the substrate,
wherein, the respective waveguide includes a cross-sectional area that has a narrow side and a wide side, the narrow side being shorter than the wide side,
wherein each of the microstrip lines is provided through the narrow side of the respective waveguide into the respective waveguide to the respective radiator element which resides in an interior of the respective waveguide,
wherein each of the microstrip lines and each of the radiator elements are arranged on a surface of the substrate that faces the waveguides, and
wherein adjacent ones of the radiator elements of the waveguides couplings are arranged at a distance from one another, the distance being smaller or equal to half of a wavelength of the radar signal.

* * * * *